(12) United States Patent
Miessmer

(10) Patent No.: US 8,875,354 B2
(45) Date of Patent: Nov. 4, 2014

(54) HOSE CLAMP

(75) Inventor: Stefan Miessmer, Zürich (CH)

(73) Assignee: Hans Oetiker AG Maschinen-und Apparatefabrik, Horgen (CH)

(*) Notice: Subject to any disclaimer, the term of this patent is extended or adjusted under 35 U.S.C. 154(b) by 1 day.

(21) Appl. No.: 13/808,177

(22) PCT Filed: Jul. 9, 2010

(86) PCT No.: PCT/EP2010/004205
§ 371 (c)(1),
(2), (4) Date: Feb. 7, 2013

(87) PCT Pub. No.: WO2012/003851
PCT Pub. Date: Jan. 12, 2012

(65) Prior Publication Data
US 2013/0125348 A1      May 23, 2013

(51) Int. Cl.
*F16L 33/035* (2006.01)
*F16L 33/025* (2006.01)

(52) U.S. Cl.
CPC ............ *F16L 33/035* (2013.01); *F16L 33/025* (2013.01)
USPC ........................... 24/20 CW; 24/19; 24/20 R

(58) Field of Classification Search
CPC ....... F16L 33/035; F16L 33/025; F16L 21/00; F16L 33/04; F16L 33/02; F16B 2/08; F16B 17/008; B65D 63/02; B65D 63/04; F16J 3/042; F16D 3/845; F01N 13/1844; F01N 13/185; F01N 2450/20
USPC ............................. 24/19, 20 R, 20 CW, 270
See application file for complete search history.

(56) References Cited

U.S. PATENT DOCUMENTS

| | | | | |
|---|---|---|---|---|
| 3,789,463 A * | 2/1974 | Oetiker | ..................... | 24/20 CW |
| 4,299,012 A * | 11/1981 | Oetiker | ............................. | 24/19 |
| 4,315,348 A * | 2/1982 | Oetiker | ..................... | 24/20 CW |
| 4,430,775 A * | 2/1984 | Arthur | ..................... | 24/20 CW |
| 4,517,708 A * | 5/1985 | Calmettes et al. | ........ | 24/20 CW |
| RE33,639 E * | 7/1991 | Oetiker | ..................... | 24/20 CW |
| 5,070,580 A | 12/1991 | Oetiker | | |
| 5,105,509 A * | 4/1992 | Lilley | ............................ | 24/20 R |
| 5,111,555 A | 5/1992 | Oetiker | | |
| 5,177,836 A * | 1/1993 | Kemmerich | ................. | 24/20 R |
| 5,307,541 A * | 5/1994 | Nagano | ......................... | 24/20 R |
| 5,375,299 A * | 12/1994 | Nagano | ......................... | 24/20 R |
| RE35,384 E * | 12/1996 | Oetiker | ........................ | 24/20 R |
| 5,669,113 A * | 9/1997 | Fay | ............................ | 24/20 CW |

(Continued)

FOREIGN PATENT DOCUMENTS

WO          0250468 A1     6/2002
WO       2009152832 A1    12/2009

OTHER PUBLICATIONS

Search Report for International Patent Application No. PCT/EP2010/004205; Apr. 6, 2011.

*Primary Examiner* — Robert J Sandy
*Assistant Examiner* — David Upchurch
(74) *Attorney, Agent, or Firm* — Barnes & Thornburg LLP

(57) ABSTRACT

A hose clamp with a tightening ear having a drop-shaped recess in the inner side of the clamping band in an area which contacts the hose, the recess counteracting a widening of the tightening ear after the hose clamp has been tightened.

6 Claims, 1 Drawing Sheet

(56) References Cited

U.S. PATENT DOCUMENTS

| | | |
|---|---|---|
| 6,247,206 B1 * | 6/2001 | Craig, Jr. .................... 24/20 R |
| 6,687,960 B2 * | 2/2004 | Kitamura et al. ............ 24/20 R |
| 7,062,821 B2 * | 6/2006 | Sidaine et al. .............. 24/20 TT |
| 7,093,326 B2 * | 8/2006 | Meier et al. .................. 24/20 R |
| 2009/0235492 A1 * | 9/2009 | Streuli ............................ 24/19 |
| 2011/0173779 A1 * | 7/2011 | Meier et al. ...................... 24/19 |

\* cited by examiner

HOSE CLAMP

PRIORITY CLAIM

This patent application is a U.S. National Phase of International Patent Application No. PCT/EP2010/004206, filed 9 Jul. 2010, the disclosure of which is incorporated herein by reference in its entirety.

FIELD

Hose clamps having an ear-type tightening device, the so-called "Oetiker-ear", are tightened about a hose, which may surround a pipe nipple, by means of the "tightening ear" being narrowed using a pair of pliers or a pliers-type tightening tool. The tightening ear consists of two outward extending legs and a bridge portion interconnecting the legs. In the tightened condition, depending on the size of the hose clamp, the inner ends of the legs will almost contact one another. Upon application of the specified closing force, the clamp is considered to have been correctly closed if the ear has been narrowed to achieve a diametrical reduction of 50%. The difference between this position and the point where the inner ends of the legs nearly contact one another in the tightened condition is the tightening range of the clamp.

A problem existing with this type of tightening device resides in the fact that when the tightening tool is removed, the narrowed tightening ear will somewhat widen due to the resiliency of the hose and also of the clamping band itself. This widening constitutes a reduction of the tightening force exerted on the hose which, in borderline cases, may result in leakage.

Theoretically, it would be possible to limit the widening by using a harder or thicker clamping band material. Apart from the resulting higher material expenditure, the use of a harder or thicker material outside the clamping ear is undesirable also for the fact that the hose clamp should have a certain resiliency to compensate irregularities in the hose and the object (pipe nipple) surrounded by the hose.

BACKGROUND

From U.S. Pat. No. 5,070,580, it is known to reinforce the tightening ear by an outer clip of a substantially stronger material which is placed over the ear and is narrowed together with the same. The clip constitutes an additional component which increases the production cost and complicates the installation of the hose clamp. Moreover, the tightening ear reinforced by the clip constitutes an additional imbalance for rotating parts.

Other ways of reinforcing the tightening ear are known from U.S. Pat. No. 5,111,555. There, the tightening ear is formed of two layers or again reinforced by externally applied clips or brackets. This results in the disadvantages explained above.

SUMMARY

Disclosed embodiments at least partially avoid the disadvantages that occur in known hose clamps having ear-type tightening means. Disclosed embodiments provide a hose clamp with an ear-type tightening device that has an increased holding force in the tightened condition.

Specifically, disclosed embodiments counteract the tendency of the tightening ear to widen after having been tightened.

BRIEF DESCRIPTION OF THE DRAWINGS

Disclosed embodiments will be explained in more detail below with reference to the drawing, in which.

DETAILED DESCRIPTION OF THE DISCLOSED EMBODIMENTS

At least one disclosed embodiment has the effect that when the tightening ear is narrowed to reduce the diameter of the hose clamp, hose material will enter into the recess. In the relative movement between the clamping band and the hose caused by the narrowing of the tightening ear, more and more hose material will be pushed into the recess which has a width that increases in this moving direction. When the tightening tool is removed from the ear at the end of the tightening process, there will be an opposite relative movement between the clamping band and the hose. During this movement, the hose material which has entered the recess will be urged in the direction of decreasing width of the recess and will get jammed thereby hindering the back movement. In other words, the tightening ear can no longer widen to the extent expected due to its resiliency.

Disclosed embodiments of the shapes of the recess have been found to be particularly effective.

Another disclosed embodiment provides that the relative movement between the clamping band and the hose is largest in the environment of the tightening device.

Yet another disclosed embodiment provides an open-type hose clamp having mutually overlapping end portions, wherein the tightening device is disposed in an area of the outer end portion overlapping the inner end portion.

In at least one disclosed embodiment an open-type hose clamp, the recess is provided in the part of the inner clamping band end portion underneath the tightening ear where the relative movement between the clamping band and the hose is maximum. At the same time, the deformation of the clamping band material at this location results in a stiffening which counteracts any bulging of the clamping band underneath the tightening ear.

Still another disclosed embodiment provides outward extending embossment which forms the recess may have the effect of additionally securing the clamping band under the tightening ear. This function is available particularly in a case where, in accordance with claim 9, the tightening ear has an outward extending stiffening bead.

Figure 1:
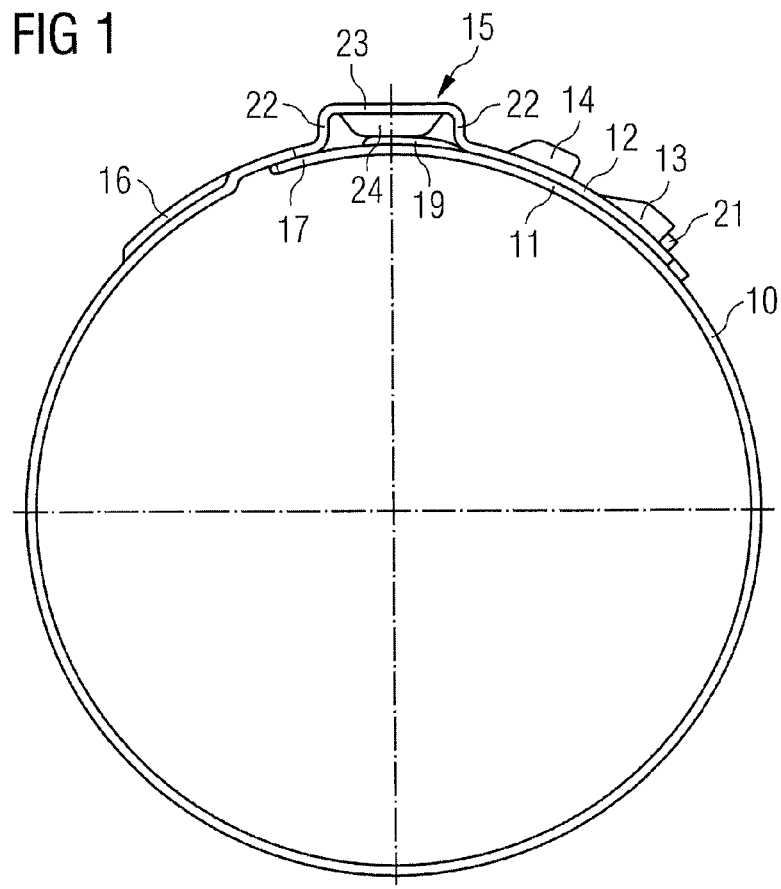
FIG. 1 is a side view of an open-type hose clamp in a condition corresponding to the mounted condition in which the two clamping band ends overlap and are fixed to one another but the tightening ear has not yet been narrowed.

The open-type hose clamp shown in the drawing consists of a clamping band 10 which, in the condition shown in FIG. 1, forms an inner end portion 11 and an outer end portion 12 overlapping the inner end portion. Starting from the right-hand end in FIG. 1, there are formed by cold deformation in the outer end portion 12 a guide holder 13, a support holder 14, a tightening device 15 in the form of a so-called "Oetiker ear" and a tongue guide 16. In the inner end portion 11 of the clamping band 10, which is also seen in FIGS. 2 and 3, starting from the free end thereof, there is formed a tongue 17 having a width reduced with respect to the full clamping band 10 and a guide nose 18, an embossment 19, which has a drop shape in the plan view of FIG. 2, a support hook 20 and a guide hook 21.

The tightening ear 15 is formed by two legs 22 bent outward from the clamping band 10 and an interconnecting web portion 23. An outward concave stiffening bead 24 is formed in the web portion 23.

Except for the embossment 19, the hose clamp of this disclosed embodiment may correspond to the hose clamp known from WO 2009/152832 A1.

Figure 2:
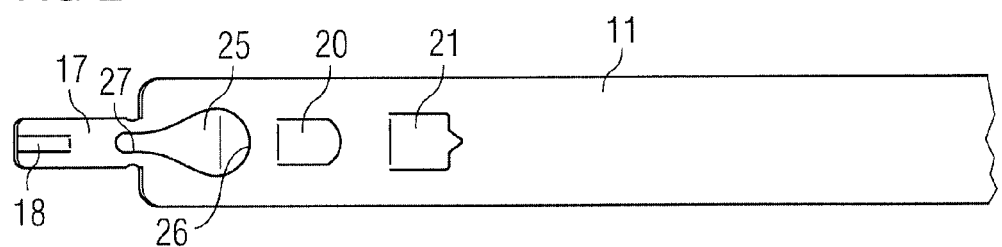
FIG. 2 is a plan view of the inner clamping band end portion according to FIG. 1.
Figure 3:
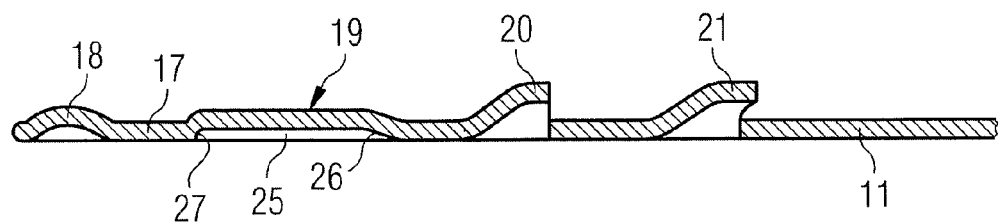
FIG. 3 is an enlarged longitudinal section through the inner clamping band end portion.

In this disclosed embodiment, the embossment 19 according to FIG. 2 has the shape of a drop falling from the inner clamping band end toward the centre of the clamping band, which means that the width measured transversely of the longitudinal direction of the clamping band 10 decreases from the centre of the clamping band, which is assumed at the right in FIG. 2, toward the left-hand end of the clamping band, with both ends being rounded. The depth of the recess 25 formed by the embossment 19, which is concave toward the inner side of the hose clamp, is substantially equal to the thickness of the clamping band 10, which means that the embossment 19, as shown in FIG. 3, at the outer side of the inner end portion 11 has a height corresponding to about the thickness of the clamping band.

The greatest width of the recess 25 is approximately ½, its smallest width about 1/10 to 1/5 that of the clamping band width. As shown in FIG. 3, the inner wall of the recess 25 at the right-hand end in FIG. 3 has a shallow starting chamfer 26 and at the opposite end a steep terminal chamfer 27.

As shown in FIG. 1, the stiffening bead 24 provided in the web portion 23 of the tightening ear 15 may be dimensioned such that it contacts the embossment 19 in the condition shown. The tightening ear 15 thus supports the portion of the clamping band 10 provided with the embossment 19 against bulging.

When the tightening ear 15 is narrowed from the initial condition shown in FIG. 1 by means of a pair of pliers (not shown) engaging the two legs 22, the diameter of the hose clamp is reduced and exerts pressure on the hose (not shown), which lies between the clamping band 10 and the object surrounded thereby, e.g. a pipe nipple. Due to the diametrical reduction of the hose clamp, a relative movement takes place between the clamping band 10 and the hose, which has its maximum in the area of the tightening ear 15 and decreases toward the centre of the clamping band, i.e. in the direction of the area diametrically opposite the tightening ear 15. The pressure exerted on the hose and the relative movement described above result in hose material being pressed into the recess 25.

When the pliers are removed, the resiliency of the hose and also that of the basically non-elastically deformed tightening ear 15 have the effect that the latter is somewhat widened. When this happens, a relative counter movement will take place between the hose and the clamping band 10 whereby the hose material which was pressed into the recess 25 will be urged toward the smaller width of the recess 25 and become jammed there. This jamming confines the widening of the tightening ear 15 which would otherwise be greater.

During closure, the starting chamfer 26 of the recess 25 which exists at the right-hand end in FIG. 3, causes the hose material being compressed to slide out in the direction of the closing movement, thereby avoiding any braking effect during the closure of the ear. On the other hand, when the pliers are removed and the tightening ear 15 starts to spring back, the steeper terminal chamfer 27 at the smaller and possibly deeper end of the recess 25 increases the compression and braking effect of the compressed hose material.

Tests were performed on a hose clamp having a nominal diameter of 60 mm, a clamping band width of 10 mm, a band thickness of 0.8 mm, and a length of the tightening ear 15 of 13 mm measured in the circumferential direction, using a closing force of the pliers of 6,400 N. Upon removal of the pliers, a hose clamp having the recess 25 showed an average length of the closing gap underneath the tightening ear 15 of 3.03 mm, a total radial force exerted on the hose by the hose clamp of 4,400 N, and an average contact pressure per unit area of 2.45 N/mm$^2$. For determining the total radial force, a medium force of 550 N was measured by eight sensors equiangularly disposed along the circumference.

A clamp without the recess 25 but otherwise identical dimensions showed under the same test conditions an average length of the closing gap of 3.25 mm, a medium radial force of 3,840 N and a medium contact pressure per unit area of 2.17 N/mm$^2$. In relation to the radial force exerted by the hose clamp upon removal of the pliers, this corresponds to an increase by about 14%.

This improvement means that in many cases a less expensive steel may be used instead of the commonly used high-strength stainless steel. Since the material expenditure in hose clamps of this type amounts to about 85% of the overall cost, the increase in the holding force achieved represents a substantial saving.

Instead of the drop shape described above, the recess 25 may have, e.g., a substantially triangular shape with rounded corners, with the width always decreasing from the centre of the clamping band toward the inner clamping band end.

The position of the recess 25 in the area of the inner clamping band end portion 11 underneath the tightening ear 15, as described above, is particularly advantageous for the reasons explained above. It is principally possible to arrange the recess at other locations of the clamping band 10, even in an area of the outer end portion 12 which contacts the hose. Since the relative movement between the hose and the clamping band 10 is maximum in the area of the tightening ear 15, the recess 25 should be at least in the neighbourhood thereof.

LIST OF REFERENCE NUMBERS

| | |
|---|---|
| 10 | clamping band |
| 11 | inner end portion |
| 12 | outer end portion |
| 13 | guide holder |
| 14 | support holder |
| 15 | tightening ear |
| 16 | tongue guide |
| 17 | tongue |
| 18 | guide nose |
| 19 | embossment |
| 20 | support hook |
| 21 | guide hook |
| 22 | legs |
| 23 | web portion |
| 24 | stiffening bead |
| 25 | recess |
| 26 | starting chamfer |
| 27 | terminal chamfer |

The invention claimed is:

1. A hose clamp for clamping a hose to an object, the hose clamp comprising:
   a clamping band in which an ear-like tightening device has two outward extending legs and a web portion interconnecting the legs;

wherein an inner side of the clamping band has a recess in an area which, in a tightened condition, lies upon the hose, the recess having its boundary entirely within the clamping band;

wherein the recess has a shape of a drop falling toward the center of the clamping band;

wherein the width of the drop shaped recess decreases in a direction from a center of the clamping band toward an end thereof as viewed in a longitudinal direction of the band;

wherein the drop shape recess has a surrounding wall which is shallower at a wider end of the drop shaped recess than at a narrower end; and wherein the drop shape of the recess hinders back movement of the hose such that hose material that has entered into the recess when the tightening device has been narrowed is urged in the direction of decreasing width of the recess when the tightening force is removed.

2. The hose clamp of claim 1, wherein the drop shaped recess is disposed near the tightening device.

3. The hose clamp of claim 1, wherein the clamping band, in a condition in which the clamping band is mounted on said object, forms an inner end portion and an outer end portion overlapping the inner end portion, and the tightening device is disposed in an area of the outer end portion overlapped by the inner end portion.

4. The hose clamp of claim 3, wherein the drop shaped recess is disposed in that part of the clamping band which in the mounted condition of the hose clamp lies between the legs of the tightening device.

5. The hose clamp of claim 4, wherein the drop shaped recess is defined by an embossment projecting from an outer side of the clamping band.

6. The hose clamp of claim 5, wherein the web portion of the ear-like tightening device is stiffened by an outward concave bead.

\* \* \* \* \*